US012785125B2

(12) United States Patent
Boukari

(10) Patent No.: US 12,785,125 B2
(45) Date of Patent: Nov. 3, 2026

(54) METHOD FOR PRODUCING A HYDROGEN-GENERATING FUEL, HYDROGEN-GENERATING FUEL OBTAINED, METHOD FOR PRODUCING HYDROGEN FROM THE FUEL, DEVICE FOR CARRYING OUT THE PRODUCTION METHOD, METHOD FOR OPERATING THE DEVICE, AND HYDROGEN-BASED FUEL OBTAINED BY MEANS OF THE HYDROGEN PRODUCTION METHOD

(71) Applicants: PRODOSE, Bessieres (FR); Morou Boukari, Toulouse (FR)

(72) Inventor: Morou Boukari, Toulouse (FR)

(73) Assignees: PRODOSE, Bessieres (FR); Morou Boukari, Toulouse (FR)

( * ) Notice: Subject to any disclaimer, the term of this patent is extended or adjusted under 35 U.S.C. 154(b) by 1062 days.

(21) Appl. No.: 17/772,821

(22) PCT Filed: Oct. 28, 2020

(86) PCT No.: PCT/FR2020/051945

§ 371 (c)(1),
(2) Date: Apr. 28, 2022

(87) PCT Pub. No.: WO2021/084204

PCT Pub. Date: May 6, 2021

(65) Prior Publication Data

US 2023/0006225 A1 Jan. 5, 2023

Related U.S. Application Data

(60) Provisional application No. 63/082,714, filed on Sep. 24, 2020, provisional application No. 63/077,946,
(Continued)

(51) Int. Cl.
*H01M 8/065* (2016.01)
*C01B 3/08* (2026.01)
(Continued)

(52) U.S. Cl.
CPC ............... *H01M 8/065* (2013.01); *C01B 3/08* (2013.01); *C10L 8/00* (2013.01); *C10L 10/04* (2013.01);
(Continued)

(58) Field of Classification Search
CPC ..... H01M 8/065; C01B 3/08; C01B 2203/066
See application file for complete search history.

(56) References Cited

U.S. PATENT DOCUMENTS

| | | | | |
|---|---|---|---|---|
| 2010/0143240 A1* | 6/2010 | Najim | C01B 3/065 423/657 |
| 2016/0322660 A1* | 11/2016 | Yows | C01B 3/065 |

(Continued)

FOREIGN PATENT DOCUMENTS

| | | | |
|---|---|---|---|
| AT | 505873 A1 * | 4/2009 | C01B 3/065 |
| FR | 2 658 181 | 8/1991 | |
| WO | WO-9007276 A2 * | 7/1990 | A01N 57/20 |

OTHER PUBLICATIONS

Machine Translation of AT505873A1. (Year: 2009).*
(Continued)

*Primary Examiner* — Jonathan G Jelsma
(74) *Attorney, Agent, or Firm* — NIXON & VANDERHYE

(57) ABSTRACT

Disclosed is a method for producing a hydrogen-generating fuel, the hydrogen-generating fuel obtained, a method for producing hydrogen from the fuel, a device for carrying out the production method, a method for operating the device, and a hydrogen-based fuel obtained by use of the production method. The production method is characterized in that it
(Continued)

consists in mixing, in a liquid, particles of one or more metals which are corrodible by a basic chemical substance or an acidic chemical substance for the purpose of producing hydrogen, the particles being kept in suspension in the liquid, and the mixture composed of the liquid and the particles being chemically stabilized so as to prevent chemical reaction between the liquid and the particles.

10 Claims, 3 Drawing Sheets

Related U.S. Application Data filed on Sep. 14, 2020, provisional application No. 63/071,613, filed on Aug. 28, 2020, provisional application No. 62/946,533, filed on Dec. 11, 2019, provisional application No. 62/927,388, filed on Oct. 29, 2019.

(51) Int. Cl.
*C10L 8/00* (2006.01)
*C10L 10/04* (2006.01)

(52) U.S. Cl.
CPC .................. *C01B 2203/066* (2013.01); *C10L 2200/0204* (2013.01); *C10L 2200/04* (2013.01); *C10L 2270/06* (2013.01); *C10L 2290/38* (2013.01)

(56) References Cited

U.S. PATENT DOCUMENTS

2016/0325989 A1* 11/2016 Zheng .................... C01B 3/065
2018/0230007 A1* 8/2018 Collins .................... C01B 3/06

OTHER PUBLICATIONS

A.A. El-Meligii, "Hydrogen production by aluminum corrosion in hydrochloric acid and using inhibitors to control hydrogen evolution", National Research Centre, Physical Chemistry Dept., Centre of Excellence for Advanced Science, Electrochem. and Corrosion Lab. pp. 1060-1067. (Year: 2011).*
International Search Report for PCT/FR2020/051945 mailed Feb. 8, 2021, 6 pages.
Written Opinion of the ISA for PCT/FR2020/051945 mailed Feb. 8, 2021, 7 pages.

* cited by examiner

METHOD FOR PRODUCING A HYDROGEN-GENERATING FUEL, HYDROGEN-GENERATING FUEL OBTAINED, METHOD FOR PRODUCING HYDROGEN FROM THE FUEL, DEVICE FOR CARRYING OUT THE PRODUCTION METHOD, METHOD FOR OPERATING THE DEVICE, AND HYDROGEN-BASED FUEL OBTAINED BY MEANS OF THE HYDROGEN PRODUCTION METHOD

CROSS-REFERENCE TO RELATED APPLICATIONS

This application is the U.S. national phase of International Application No. PCT/FR2020/051945 filed Oct. 28, 2020 which designated the U.S. and claims priority to U.S. 63/082,714 filed Sep. 24, 2020, U.S. 63/077,946 filed Sep. 14, 2020, U.S. 63/071,613 filed Aug. 28, 2020, U.S. 62/946,533 filed Dec. 11, 2019, and U.S. 62/927,388 filed Oct. 29, 2019, the entire contents of each of which are hereby incorporated by reference.

BACKGROUND OF THE INVENTION

Field of the Invention

The invention relates to the field of hydrogen production and in particular to the adaptations allowing it to be used in the best conditions as a fuel.

Description of the Related Art

There are a number of techniques for producing hydrogen (or more precisely dihydrogen). Among these techniques, there is the technique of producing dihydrogen based on the corrosion of a metal such as aluminum or zinc. This corrosion does not require a supply of electrical energy in the hydrogen production phase compared to other methods such as electrolysis.

It could therefore be considered as a means of producing a fuel which would then be transportable and capable of equipping a means of transport. Nevertheless, the current yield and speed of said reaction are an obstacle to such development.

However, this corrosion is a reaction that can be activated.

In addition, the solid state of the metal constitutes a difficulty in the development of such a solution for producing hydrogen. In fact, the operations for conditioning the elements participating in the reaction, for bringing them into contact with a corrosive medium, the recovery of the waste resulting from the reaction, the resupply in metal are all phases that are difficult to implement within the framework of a power supply for example of a vehicle.

SUMMARY OF THE INVENTION

Based on this observation, the applicants conducted research aimed at optimizing the production of dihydrogen from a corrosion reaction in order to make it industrially viable by seeking the best way not only to activate it but also to conditioning the different elements participating in it.

Thus, an object of the invention relates to a hydrogen-generating fuel. The production of this fuel as well as its use for the purpose of hydrogen production are also objects of the present invention.

Another object of the invention is the in-situ production and at the time of use of a hydrogen-based fuel or of a hydrogen-based fuel-oxidizer mixture and the use of this fuel or this fuel-oxidant mixture in internal and/or external combustion fireplaces and in particular in piston engines, in gas turbines, in jet engines of air vehicles and in rockets.

This fuel or this fuel-oxidant mixture can also be used in any combustion fireplace in an industrial or domestic environment.

Another object of the invention is to produce hydrogen with a system energy density of up to 4 Kwh/Kg.

This research also led to a method allowing the increase of hydrogen production from a corrosion reaction while keeping the advantages of such a reaction without the disadvantages.

The method for producing a hydrogen-generating fuel according to the invention is remarkable in that it consists in mixing in a liquid, particles of one or more metals which are corrodible by a basic chemical substance or an acidic chemical substance for the purpose of hydrogen production, said particles being kept in suspension in said liquid and the mixture made up of the liquid and said particles being chemically stabilized so as to prevent the chemical reaction between the liquid and said particles.

This feature makes it possible to package in a liquid form the substances involved in the production of hydrogen by corrosion of metal. This packaging makes it possible to store and transfer the provided fuel and to make the latter react on demand.

Such a method provides a better yield of the corrosion reaction for the purpose of hydrogen production by creating a suspension of metal powder guaranteeing a reaction on all of the metal.

The implementation of this reaction is facilitated because hydrogen can be produced on demand in a vehicle. According to this embodiment, it is then not mandatory to store the hydrogen and/or to condition it under pressure.

The advantages of the method according to the invention are understood compared to the methods of the prior art which had the following disadvantages in particular:

- they required a lot of energy for their production,
- they required energy for the compression and possibly the recompression of the hydrogen produced,
- they required the transport of hydrogen under pressure by handling equipment and by vehicles using this energy,
- they required equipment with dedicated technologies.

Of course, the applicants do not prohibit themselves from applying this method to the supply of a hydrogen distribution station since the method according to the invention always provides the advantage of a demand-driven supply of hydrogen.

In addition, the station itself is then supplied with non-flammable products, namely a corrosive medium on the one hand and a metallic suspension on the other hand.

According to another particularly advantageous feature of the invention, the size of the particles of one or more metals is between 0.001 micron and 1000 microns and can be of different sizes, the size preferably being comprised in one of following ranges:

- between 1 and 500 microns,
- between 1 and 200 microns,
- between 100 and 200 microns.

The particle size is chosen depending on whether a fast or slow onset reaction is desired.

According to another particularly advantageous feature of the invention, said liquid is a mineral liquid or an organic liquid or a mixture of both. An organic liquid is a liquid of organic chemical nature and a mineral liquid is a liquid of mineral chemical nature.

According to another particularly advantageous feature of the invention, the particles are kept in suspension in the liquid using at least one of the following methods:

- by mechanical agitation of the mixture made up of the liquid and the particles,
- by forced circulation of the mixture made up of the liquid and the particles using a pump,
- by addition to the liquid before mixing with particles of one or more anti-sedimentation chemical substances,
- by addition to the mixture made up of the liquid and the particles of one or more anti-sedimentation chemical substances,
- by addition to the mixture made up of the liquid and the particles of one or more particle anti-caking chemical substances.

According to another particularly advantageous feature of the invention, the anti-sedimentation chemical substance is a liquid-thickening substance of the mineral-type and/or of the organic-type.

According to another particularly advantageous feature of the invention, the anti-sedimentation and liquid-thickening chemical substance is magnesium aluminum silicate.

According to another particularly advantageous feature of the invention, the mixture made up of the liquid and the particles is chemically stabilized so as to prevent or reduce the chemical reaction between the liquid and the particles.

According to another particularly advantageous feature of the invention, the particles are encapsulated with chemical substances of mineral-type or of organic-type, which substances are non-reactive with the liquid so as to prevent or reduce the chemical reaction between the liquid and particles.

According to another particularly advantageous feature of the invention, the stabilization of the mixture made up of the liquid and the particles is carried out by at least one of the following methods:

- by maintaining the pH of the liquid before mixing with the particles between 1 and 7 or between 7 and 9 depending on the chemical nature of the metals corrodible by a basic substance or an acidic substance,
- by maintaining the pH of the mixture made up of the liquid and the particles between 1 and 7 or between 7 and 9 depending on the chemical nature of the metals corrodible by a basic substance or an acidic substance,
- by maintaining the pH of the mixture made up of the liquid, the anti-sedimentation agent and the particles between 1 and 7 or between 7 and 9 depending on the chemical nature of the metals corrodible by a basic substance or an acidic substance,
- by maintaining the pH of the mixture made up of the liquid, the anti-sedimentation agent, the anti-caking agent and the particles between 1 and 7 or between 7 and 9 depending on the chemical nature of the metals corrodible by a basic substance or an acidic substance.

According to another particularly advantageous feature of the invention, maintaining the pH between 1 and 7 is achieved by adding an acidic substance of the H2SO4 or HCl or H3PO4 or CO2 type or any type of mineral or organic acid.

According to another particularly advantageous feature of the invention, maintaining the pH between 7 and 9 is achieved by adding a basic substance of the NaOH or KOH type, or sodium silicate or sodium metasilicate or sodium ethanolate or potassium ethanolate or lithium ethanolate or sodium methanolate or potassium methanolate or lithium methanolate or any type of inorganic or organic base.

According to another particularly advantageous feature of the invention, one or more metals which are corrodible by an acidic substance or by a basic substance is chosen from the following list:

- Aluminum
- Aluminum alloy,
- Zinc,
- Zinc alloy,
- Iron,
- Iron alloy,
- Copper,
- Copper alloy,
- Magnesium,
- Magnesium alloy.

According to another particularly advantageous feature of the invention, the mass percentage of the particles in the liquid is between 1 and 99% and preferably within one of the following ranges:

- between 1 and 40%,
- between 1 and 50%,
- between 30 and 50%,
- between 40 and 50%,
- between 50 and 99%.

According to another particularly advantageous feature of the invention, the liquid is water, therefore a mineral liquid.

According to another particularly advantageous feature of the invention, the liquid is a volatile and/or combustible organic liquid of the methanol or ethanol or butanol or propanol or gasoline or diesel type or of any type of fuel used in land or air or sea vehicles.

According to another particularly advantageous feature of the invention, the liquid is a volatile and/or combustible organic liquid whose evaporation (volatilization) temperature is between 60 and 100° C. or between 80 and 150° C. or between 100 and 200° C.

According to another particularly advantageous feature of the invention, the liquid contains an antifreeze.

Another object of the invention relates to the hydrogen-generating fuel obtained by said production method.

According to the invention, the hydrogen-generating fuel obtained by the production method according to all or part of the features described above, is remarkable in that it comprises:

- particles of one or more metals which are corrodible by a basic chemical substance or an acidic chemical substance for the purpose of hydrogen production,
- a liquid,
- which particles are suspended in said liquid and the mixture made up of the liquid and said particles is chemically stabilized so as to prevent the chemical reaction between the liquid and said particles.

This feature is particularly advantageous in that it provides the production of a new fuel consisting of the suspension of a metal in a liquid. This fuel feeds a hydrogen production module ensuring the corrosion of said metal in suspension.

Such a fuel, being liquid, can be managed with technologies already known for conventional fuels.

Another object of the invention relates to the method for producing hydrogen from the fuel described above.

According to the invention, the method for producing hydrogen from said fuel is remarkable in that the generation of hydrogen takes place by the addition to the fuel of one or more chemical substances of the acid-type or of the base type, which acid-type or base-type substance forming a corrosion medium is at a concentration suitable to cause immediate corrosion of particles of one or more metals in the fuel and release of hydrogen.

This production method implements a corrosion reaction of a first metal in a corrosion medium, said corrosion reaction being catalyzed by a substance of the acid or base-type contained in the corrosion medium, said metal being conditioned in the form of a powder suspended in a fluid.

According to another particularly advantageous feature of the invention, the acid-type chemical substance which attacks the particles by corrosion of one or more metals in the fuel corresponds to any type of mineral acid or organic acid or to a mixture of said types and preferably of the H2SO4 or HCl or CO2 type.

According to another particularly advantageous feature of the invention, the base-type chemical substance which attacks the particles by corrosion of one or more metals in the fuel corresponds to any type of mineral base or organic base or to a mixture of said types and preferably is of the NaOH, or KOH, or NaHO2, or KHO2 type or is a mixture of H2O2 and NaOH or a mixture of H2O2 and KOH or NH4OH or a mixture of NH4OH and NaOH or a mixture of NH4OH and KOH.

According to another particularly advantageous feature of the invention, the acid-type or base-type chemical substance which attacks the particles by corrosion of one or more metals in the fuel is in solution in a mineral-type and/or organic-type liquid or in a mixture of said types.

According to another particularly advantageous feature of the invention, the acid-type or base-type chemical substance which attacks the particles by corrosion of one or more metals in the fuel is partially dissolved (with the undissolved part in suspension) or is suspended in a mineral-type or organic-type liquid or in a mixture of said types.

According to another particularly advantageous feature of the invention, the acid-type or base-type chemical substance which attacks the particles by corrosion of one or more metals in the fuel is completely dissolved in a mineral-type or organic-type liquid or in a mixture of said types.

According to another particularly advantageous feature of the invention, the acid-type or base-type chemical substance which attacks the particles by corrosion of one or more metals in the fuel is in solution in a liquid at a mass concentration of between 1 and 50% and preferably according to one of the following ranges:

between 1 and 20%, between 1 and 10%, between 5 and 10%, between 10 and 20%, between 20 and 50%.

According to another particularly advantageous feature of the invention, the liquid in which the acid-type or base-type chemical substance which attacks the particles by corrosion is in solution, is water.

According to another particularly advantageous feature of the invention, the acid-type or base-type chemical substance which attacks the particles by corrosion is contained in a gas.

According to another particularly advantageous feature of the invention, the acid-type or base-type chemical substance is in solution or is partially dissolved or is in suspension in an organic liquid or in a mixture of organic liquid and water, which organic liquid is of the methanol or ethanol or butanol or propanol or gasoline or diesel type or of any type of fuel used in land or air or sea vehicles or mineral liquid of the ammonia NH4OH type.

According to another particularly advantageous feature of the invention, the chemical reaction developed during the generation of hydrogen and during the temperature rise of the reaction medium during this hydrogen generation reaction as well as the by-products resulting from the reaction, cause a partial or total cracking into hydrogen of the organic liquid of the methanol or ethanol or butanol or propanol or gasoline or diesel type or of any type of fuel used in land or air or sea vehicles or mineral liquid of the ammonia NH4OH type. The carbon dioxide produced during this cracking is neutralized by the basic substance in the form of carbonate and bicarbonate, which carbonate or bicarbonate remains trapped in the residues of the reaction.

According to another particularly advantageous feature of the invention, the acid-type or base-type chemical substance is contained in a gas, which gas is water vapor or air or nitrogen or ammonia (NH3).

According to another particularly advantageous feature of the invention, the non-volatile residue from the hydrogen generation reaction contains compounds of the corrodible metal(s) composed of hydroxide or oxide of these metals, which compounds are recycled and regenerated by electrolysis so as to produce again corrodible metals.

According to another particularly advantageous feature of the invention, the non-volatile residue of the hydrogen generation reaction contains aluminum hydroxide or alumina, which aluminum hydroxide or which alumina is recycled and regenerated by electrolysis to produce again metallic aluminum.

According to another particularly advantageous feature of the invention, said corrosion reaction is activated and catalyzed, by galvanic contact of a first metal with a second metal selected so that its standard electrode potential is greater than the standard electrode potential of the first metal and that of hydrogen, which first metal has a surface smaller than the surface of the second metal with which it is in contact, which second metal does not react or hardly reacts when contacted with the acid-type or base-type substance contained in the corrosion fluid medium, which production of hydrogen takes place on both the first metal and the second metal.

The suspension and keeping in suspension of the metal in the liquid can be achieved by various means of creating turbulence.

This can also be achieved by chemical means.

Putting a powdered metal into solution is likely to trigger a reaction which is to be avoided at the production stage of said fuel. For example the mixture of aluminum with a liquid is likely to present an acid pH which must be adjusted.

According to another particularly advantageous feature of the invention, a first metal is in the form of particles or microparticles in suspension in an aqueous medium, which aqueous medium contains one or more chemical agents making it possible to avoid the agglomeration and sedimentation of the particles of the first metal, which aqueous medium and which anti-caking and anti-sedimentation agents are chosen so that they do not react chemically or react weakly with the particles of the first metal.

According to another particularly advantageous feature of the invention, one or more chemical agents making it possible to prevent the agglomeration and sedimentation of the particles of a first metal, are associated with an acid compound if the presence of said chemical agent(s) makes the solution basic, or associated with a basic compound if the presence of said chemical agent(s) makes the solution acidic. The objective is to adjust the pH to make the suspension stable.

For example, magnesium or aluminum silicates are known as an anti-caking agent, which are compounds that make a solution basic. One way to prevent the anti-caking agent from causing a reaction with the metal is to associate carbon dioxide with the solution containing the anti-caking agent.

Such a method makes it possible to obtain a stable suspension of metal powder which is easy to store, transport and dose.

According to another particularly advantageous feature of the invention, a first metal is in the form of solid microparticles or solid particles or solid powder encapsulated in an envelope of chemical nature of mineral and/or organic-type in suspension in an aqueous medium, which envelope is impermeable to the aqueous medium and to the acidic or basic substance, which envelope is also non-reactive or weakly reactive with respect to the aqueous medium.

According to another particularly advantageous feature of the invention, the acidic or basic substance of the corrosion medium is in the form of solid microparticles or solid particles or microdroplets or droplets or microgels encapsulated in an envelope of chemical nature of mineral and/or organic-type in suspension in an aqueous medium, which envelope is impermeable to the aqueous medium and to the acidic or basic substance, which envelope is also non-reactive or weakly reactive with respect to the aqueous medium.

According to another particularly advantageous feature of the invention, the acidic or basic substance of the corrosion medium is in the form of solid microparticles or solid particles or microdroplets or droplets or microgels encapsulated in an envelope of chemical nature of mineral and/or organic-type in suspension in an aqueous medium, which envelope is impermeable to the aqueous medium and to the acidic or basic substance, which envelope is also non-reactive or weakly reactive with respect to the aqueous medium and which aqueous medium contains one or more chemical agents for preventing agglomeration and sedimentation of the encapsulated acidic or basic substance, which aqueous medium and which anti-caking and anti-sedimentation agents are chosen so that they do not react chemically or react weakly with the encapsulation envelope of the acidic or basic substance.

According to another particularly advantageous feature of the invention, the release of the encapsulated acid or basic encapsulated substance or of the first encapsulated metal into the corrosion medium takes place by mechanical rupture of the encapsulation envelope or by thermal rupture of the encapsulation envelope by increasing the temperature of the corrosion medium. Mechanical breaking can be done by grinding using a grinding device or grinding means or by mechanical pressure using presses.

According to a particularly advantageous feature, one or more acid-type or base-type chemical substances are found to form a fluid corrosion medium, selected from the following:

- wet gas,
- water vapor
- flowing liquid,
- viscous liquid,
- pasty liquid,
- two-phase medium (liquid containing a dissolved base or acid-type substance+undissolved base or acid-type substance),
- three-phase medium (gas+liquid containing a dissolved base or acid-type substance+undissolved base or acid-type substance).

According to another particularly advantageous feature of the invention, the reaction is activated, by galvanic contact of the first metal with a second metal itself in contact with the same corrosion medium and selected so that its redox potential in the standard state is greater than the standard electrode potential of the first metal, which standard electrode potential of the first metal being lower than that of hydrogen and which standard electrode potential of the second metal being higher than that of hydrogen, which first metal reacts chemically with the acid-type or base-type substance contained in the corrosion medium, which first metal has a surface area less than the surface area of the second metal, and which second metal is unattackable or chemically reacts in a weakly attackable way with the acid-type or base-type substance contained in the corrosion medium, which hydrogen production is done both on the first metal and on the second metal.

If the first metal is designated as M1, the following reactions take place on M1:

$$M1 \rightarrow M1^{x+} + xe^- \quad (1) \text{ and}$$

$$yH^+ + ye^- \rightarrow b\tfrac{1}{2}yH2 \quad (2)$$

In addition, if the second metal is designated M2, the following reactions occur on M2 (in a non-limitative way):

$$zH^+ + ze^- \rightarrow \tfrac{1}{2}zH2 \quad (3)$$

$$aM1^{x+} + ae^- \rightarrow aM1 \quad (4)$$

$$bH2O + be^- \rightarrow \tfrac{1}{2}bH2 + bOH^- \quad (5)$$

With $x=a+b+y+z$

The second metal M2 acts as an electron collector and allows, among other things and in a non-limitative way, the realization of reactions (3), (4) and (5) and allows partial recycling in situ of the first metal M1.

It is understood that the first metal immersed in a corrosive medium will give off metal ions and electrons. The electrons will combine with the hydrogen ions present in the medium in order to produce dihydrogen on the first metal.

The contact with the second metal is a galvanic contact due to the standard electrode potential difference. This difference leads to the migration of additional electrons from the first metal to the second metal. These electrons will combine with the hydrogen ions present in the corrosive medium to produce dihydrogen on the second metal.

According to another particularly advantageous feature of the invention, the second metal forms the walls of a container in which the corrosion reaction takes place.

This second metal can be subjected to an electric current.

The conditioning of the first metal in the form of powder and therefore grains will facilitate its contact with the corrosive medium on the one hand and with the second metal on the other hand.

The particle size of the first metal is between 1 and 300 microns.

The particle size of the first metal is between 300 and 1000 microns.

The dihydrogen production method can also be carried out with metals already in the form of granules.

According to another particularly advantageous feature of the invention, the second metal is in the form of granules.

According to another particularly advantageous feature of the invention, the first and the second metal are in the form of granules, the granules of the first metal have dimensions that are identical to or smaller than those of the second metal.

According to another particularly advantageous feature of the invention, the first and second metals are mixed before contact with the one or more acid-type or base-type chemical substances.

It will thus be possible to create mixtures of the first and the second metal, such conditioning facilitating the operation of a device making it possible to carry out said method.

According to another particularly advantageous feature of the invention, a first metal is preconditioned in the form of grains of different grain sizes G1, G2, . . . , Gn with G1<G2<G3< . . . <Gn and with the mass concentration corresponding to each well-defined grain size. Such an arrangement makes it possible to level out the production of hydrogen over time and to maintain the production of hydrogen almost constant over a long period. Indeed, the hydrogen production reaction takes some time to reach maximum production. The production, once having reached its maximum, then decreases after a certain time. The reaction is very fast with grains of very small particle sizes, quickly reaches the maximum and also decreases rapidly.

According to another particularly advantageous feature of the invention, the grains of the first metal are in contact with each other and part of these grains is also in contact with the second metal.

According to another particularly advantageous feature of the invention, the grains of the first metal or those of the second metal can be of any shape.

According to another particularly advantageous feature of the invention, the method is remarkable in that it consists in enclosing the granules of the first metal in a cage having a porous or non-porous wall made of a second metal with the granules of the first metal in contact with each other and in contact with the wall of the porous metal cage made of the second metal, in bringing the grains of first metal to an electrical potential greater than zero volts and lower than the electrical potential for the production of dioxygen and in connecting this metal cage to the positive pole of a direct current electrical generator by connecting the negative pole to another plate of a porous or non-porous second metal, which plate is separated from the porous metal cage enclosing the grains of the first metal by means of the corrosion medium.

The fact of enclosing the grains of the first metal in a metal cage made of the second metal and connected to the positive pole of the direct current generator leads to the creation, inside this metal cage, of an electric field null, which considerably reduces the consumption of electrical energy while accelerating the corrosion of the first metal. Such electrical activation is especially advantageous for corrosion media containing acidic or basic substances of low mass concentration (for instance of less than 1%). For such a low mass concentration, the corrosion of the first metal is very low even when this corrosion is catalyzed by the galvanic contact with the second metal.

According to another particularly advantageous feature of the invention, the method is remarkable in that it consists in activating the production of hydrogen by bringing the first metal to a potential higher than zero volts and lower than the production potential of dioxygen and the second metal is connected to the positive pole of a direct current electric generator.

According to another particularly advantageous feature of the invention, the electrical activation consists in enclosing the grains of first metal between two electrodes made of second metal with the grains of the first metal in contact with each other and a part of these grains of the first metal in contact with the electrodes of the second metal.

Another object of the invention is the device for carrying out the method for producing hydrogen from hydrogen-generating fuel comprising:

particles of one or more metals which are corrodible by a basic chemical substance or an acidic chemical substance for the purpose of producing hydrogen and a liquid, the generation of hydrogen being carried out by the addition to the fuel of one or more acid-type or base-type chemical substances, which acid-type or base-type substance forming a corrosion medium causes the corrosion of the particles of one or more metals in the fuel and a release hydrogen.

According to the invention, the device is remarkable in that it comprises a reactor-tank in which the corrosion reaction is carried out, said reactor-tank being fed by a metallic suspension tank and by a corrosion medium tank.

The device for carrying out the method with electrical activation comprises:

one or more electrodes called anodes, one or more electrodes called cathodes, the so-called anode electrodes are separated from the so-called cathode electrodes by a solid, liquid and gaseous three-phase electrolyte comprising the first metal which is a solid reactive to the corrosion medium, the liquid forming the corrosion medium and the gas produced by the various reactions.

Such a device ensures the storage of electricity and of the production of dihydrogen.

It was found that for the same voltage a device carrying out the method according to claim below produced seventeen times more volume of dihydrogen than electrolysis or four times more than the reaction without electrical activation defined by the method features described above.

According to another particularly advantageous feature of the invention, the second metal is preformed in the form of a metal tank containing the grains of the first metal and inside which the corrosion medium is located or circulates. This mode of activation is independent from the electrical activation and is justified by the double corrosion+galvanic reaction.

According to another particularly advantageous feature of the invention, the tank made of second metal comprises several vertical fins of the same chemical nature as the second metal and welded to the inner wall of the tank so as to increase the contact surface between the second metal and the corrosion medium and also between the second metal and the grains of the first metal.

According to another particularly advantageous feature of the invention, the first metal is selected from the following list:

aluminum, aluminum alloy, zinc, zinc alloy, magnesium, magnesium alloy.

These metals are considered to be easily attacked by a corrosive medium such . . . for the purpose of releasing ions . . . and electrons.

According to another particularly advantageous feature of the invention, the second metal is selected from the following list:

titanium,
titanium alloy,
nickel
nickel alloy,
stainless steel,
alloy known under the trade name of Hastelloy C.

These metals are less easily attacked by chemical reaction with the corrosion medium and are likely to form electrochemical couples with the first metals where the second metal has a standard electrode potential higher than that of the first metal.

According to another particularly advantageous feature of the invention, the corrosion fluid medium is water.

According to another particularly advantageous feature of the invention, the humid gas type corrosion medium is humid water vapor.

According to another particularly advantageous feature of the invention, said acidic substance is selected from the following list:

$CO_2$,
sulfuric acid,
hydrochloric acid,
nitric acid,
sodium hydrogen sulphate.

According to another particularly advantageous feature of the invention, said basic substance is selected from the following list:

sodium hydroxide,
potassium hydroxide,
lithium hydroxide,
sodium bicarbonate,
sodium carbonate.

In order to simultaneously produce fuel (dihydrogen) and oxidizer (dioxygen), the basic substance is selected from the following list:

sodium hydroperoxide (NaHO2),
potassium hydroperoxide (KHO2),
lithium hydroperoxide (LiHO2),
calcium hydroperoxide (CaHO2).

In this case, the corrosion reaction results in the simultaneous production of hydrogen and oxygen, that is to say, the production of a mixture of hydrogen and oxygen. Such a mixture can be used for the propulsion of vehicles operating in a non-oxygen or oxygen-poor environment. This is the case of submarines, underwater drones, vehicles operating in space, or on comets, asteroids or other planets. Such a mixture can be used as fuel-oxidant by internal combustion vehicles. This mixture can also be used for combustion in combustion fireplaces, for gas turbines, for aircraft propulsion.

Indeed, the substance will, in contact with water, release acid or a base which acid or base will attack the first metal to dissolve it and also which will release at the same time another precursor substance of dioxygen, releasing this dioxygen when it is in contact with the first metal or metal ions resulting from the attack of the first metal by the acidic or basic substance.

In the presence of water, the production of such a mixture of gases takes place according to the following reactions:

$$\text{NaHO2+H2O} \rightarrow \text{NaOH+H2O2 or KHO2+H2O} \rightarrow \text{KOH+H2O2 or LiHO2+H2O} \rightarrow \text{LiOH+H2O2}$$

On M1:

$$\text{NaOH or KOH or LiOH+M1} \rightarrow \text{M1}^{x+} + xe^- \quad (1) \text{ and}$$

$$yH^+ + ye^- \rightarrow \tfrac{1}{2}y\text{H2} \quad (2)$$

In addition, if the second metal is designated M2, the following reactions take place on M2 (in a non-limitative way):

$$zH^+ + ze^- \rightarrow \tfrac{1}{2}z\text{H2} \quad (3)$$

$$a\text{M1}^{x+} + ae^- \rightarrow a\text{M1} \quad (4)$$

$$b\text{H2O} + be^- \rightarrow \tfrac{1}{2}b\text{H2} + b\text{OH}^- \quad (5)$$

With $x=a+b+y+z$

In the solution:

H2O2→O2+H2O (reaction catalyzed by the presence of $M1^{x+}$ ions in the solution.

The second metal M2 acts as an electron collector and allows, among other things and in a non-limitative way, the realization of reactions (3), (4) and (5) and allows partial recycling in situ of the first metal M1.

According to another particularly advantageous feature of the invention, one or more acid-type or base-type chemical substances are found in a medium consisting of a mixture of a solution of sodium hydroxide or potassium hydroxide or lithium hydroxide and a solution of hydrogen peroxide with the same reactions as before and the same advantages and the same applications.

According to another feature of the invention, the corrosion medium consists of a mixture of a solution of the acidic substance and a solution of hydrogen peroxide.

According to another particularly advantageous feature of the invention, the reactions produce water vapor containing dihydrogen, which water vapor is cooled and condensed so as to eliminate the water and the acidic or basic substance.

According to another particularly advantageous feature of the invention, the acid or base-type substance is a solid substance in the form of flakes or in the form of pellets packaged in dissolution cartridges inside which the corrosion medium circulates before coming into contact with one or more metals.

The sizing of the various sub-assemblies necessary for the implementation of such a method depends on the hydrogen requirements.

According to another particularly advantageous feature of the invention, the tank is preformed to have several compartments that are not communicating with each other in the lower part of the tank and communicating with each other in the upper part of the tank.

Each compartment has an inlet for metal filling,
an inlet for filling a corrosion fluid medium (acid-type or base-type liquid) in the compartment
an outlet for emptying the corrosion fluid medium and/or for emptying the metal and fluid mixture resulting from the reaction.

Each compartment has several fins welded to the walls of the tank or to the partitions separating the compartments so as to increase the contact surface between the liquid and the galvanic cathode defined by the second metal and/or so as to increase the contact surface between the galvanic cathode defined by the second metal and the first metal granules. In this way, the production of dihydrogen is increased.

According to another particularly advantageous feature of the invention, the dihydrogen production capacity can be increased by operating several compartments at the same time.

The hydrogen production capacity can be reduced by reducing the number of compartments in operation.

Another object of the invention relates to a method of operating a hydrogen production device.

According to the invention, this method of operation is remarkable in that it consists in increasing or decreasing the number of compartments in use in order to respectively increase or decrease the production capacity.

For the same number of compartments in operation, the dihydrogen production capacity can be increased or decreased by increasing or decreasing the level of liquid in each compartment.

According to another particularly advantageous feature of the invention, the method of operation is remarkable in that it consists in increasing or decreasing the level of the fluid corrosion medium in each compartment in order to respectively increase or decrease the capacity of production.

According to another particularly advantageous feature of the invention, the method is remarkable in that it operates each compartment one after the other or a group of compartments one after the other and at time intervals proportional to the ramp-up time of each chemical reaction with the first metal.

It is then possible to avoid a very large variation in the dihydrogen production rate (regulation of the dihydrogen production rate).

According to another particularly advantageous feature of the invention, the device is remarkable in that the compartments are independent tanks with the same features as the compartments described above but installed in parallel, the outputs of which are installed in parallel and joined in a single output.

According to another particularly advantageous feature of the invention, the corrosion medium of the humid gas type or of the liquid type passes through the bed of first metal granules from top to bottom.

According to another feature of the invention, the corrosion medium of the liquid or humid gas type passes through the bed of first metal granules from bottom to top.

According to another particularly advantageous feature of the invention, the granular first metal forms a bed inside the tank, said bed being passed through from bottom to top or from top to bottom by said fluid corrosion medium.

According to another particularly advantageous feature of the invention, the water vapor leaving the tank and containing dihydrogen is cooled and condensed so as to eliminate the water and the acidic or basic substance.

According to another particularly advantageous feature of the invention, the mass concentration of basic or acidic substance in the corrosion medium is less than or greater than 1% or 2% or 3% or 5% or 10% or 15% or 20%.

According to another particularly advantageous feature of the invention, the potential difference applied to the terminals of the direct current generator is less than or greater than 0.3v or 0.5v or 0.7v or 0.8v or 1v or 1.2v.

According to another particularly advantageous feature of the invention, the first metal is in the form of granules, tubes, small plates or any other form of dimensions with characteristically width/diameter and length/height.

According to another particularly advantageous feature of the invention, the second metal is in the form of grains, tubes, small plates or any other form of dimensions with characteristically width/diameter and length/height.

According to another particularly advantageous feature of the invention, the aluminum alloys are selected from the following designations:

1100, 3003, 2011, 2014, 2017, 2117, 2018, 2024, 2025, 4032, 6151, 5052, 6053, 6061, 7075.

According to another particularly advantageous feature of the invention, the granules of the first metal have dimensions that are identical to or smaller than those of the granules of the second metal.

According to another particularly advantageous feature of the invention, the titanium is chosen according to one of the following grades:

1, 2, 3, 4, 5 or 6 . . . .

According to another particularly advantageous feature of the invention, the first and second metals are mixed.

The dihydrogen production method requires preliminary steps in the preparation of a mixture of galvanic metals.

According to another particularly advantageous feature of the invention, the method consists, prior to the electrical activation, in:

- forming a mixture of a first and a second galvanic metal,
- activating said mixture by causing it to react with a fluid corrosion medium,
- draining said activated mixture after reaction and storing it in wet or dried form or draining the mixture after reaction, washing it and storing it in wet or dried form.

To do this, the method includes, prior to the actual production operation, the following operations:

- Transforming by cutting or grinding a first metal with a negative standard electrode potential (lower than that of hydrogen), attackable by a fluid or viscous liquid or a paste containing an acidic substance or a basic substance whose mass concentration in acid and in base is greater than 0.1% and less than 99%, said metal existing in the form of a plate, tube, wire or any other form in a metal set in the form of small pieces or grains of characteristic dimensions.
- Transforming by cutting or grinding a second metal with a positive standard electrode potential (higher than that of hydrogen) existing in the form of a plate, tube, wire into a metal set in the form of small plates, small pieces or grains of characteristic dimensions, the second metal being non-attackable or weakly attackable by a fluid or viscous liquid or a paste containing an acid substance or a basic substance, with a mass concentration of acid or base greater than 0.1% and less than 99%, which transformed second metal has characteristic dimensions being greater than the characteristic dimensions of the first transformed metal.
- forming a mixture of the first and second galvanic metals by mixing the metal sets in a mass ratio between 1 and 1000,
- activating said mixture by reacting it with a fluid or viscous liquid containing an acidic substance or a basic substance with a mass concentration of acid or base greater than 1% or greater than 3% or greater than 10%, for a duration between 1 minute and 24 hours, between 1 minute and 1 hour or 1 minute and 2 hours or 1 minute and 4 hours or 1 minute and 10 hours or 1 minute and 24 hours,
- draining said activated mixture after reaction and storing it in wet or dried form or draining the mixture after reaction, washing it and storing it in wet or dried form, The mixture activation step is optional and not mandatory and the draining step is optional.

According to another particularly advantageous feature of the invention, the first metal is available being already assembled with the second metal, the transformation then consisting in cutting and grinding the set formed by the two metals.

According to another particularly advantageous feature of the invention, the set formed by the first and second metal, pre-assembled, consists of parts of fuselage or wings of aircraft being dismantled.

According to another particularly advantageous feature of the invention, the hydrogen production device is connected directly to a fuel cell so as to produce electric current for the purpose of propelling air vehicles (planes, drones), land vehicles (car, bus, truck, trains, motorcycles, bicycles), sea vehicles (boats, tankers, etc.) or for any other purpose.

According to a particularly advantageous feature of the invention, the hydrogen production device can be connected to one or more fuel cells via one or more buffer tanks, which buffer tank plays the role of hydrogen accumulator.

The invention also relates to the hydrogen-based fuel obtained by the hydrogen production method described above.

According to the invention, this hydrogen-based fuel is remarkable in that the hydrogen generated also contains water vapor resulting from the vaporization of water by the heat of fuel activation reaction.

According to the invention, this hydrogen-based fuel is remarkable in that the hydrogen generated also contains water vapor and vapors of volatile and/or combustible organic liquid, which water vapors and vapors of volatile and/or combustible organic liquid result from the vaporization of the water and of the volatile and/or combustible organic liquid by the heat of the fuel activation reaction.

According to the invention, this hydrogen-based fuel is remarkable in that it has the following composition:

Hydrogen

Volume concentration in the mixture (fuel): 8 to 95% supplied from a hydrogen tank stored on site or from a hydrogen distribution network or produced on site from the electrolysis of water or from a chemical reaction between a base solution (NaOH or Na2CO3 or other base) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Water Vapor

Temperature: below the flash point temperature (flash or auto-ignition) of hydrogen Volume concentration in the mixture (fuel): 5 to 92% supplied from a pressurized water vapor distribution network or produced on site from demineralized water or distilled water or weakly mineralized water and from an electric boiler or a gas boiler or an oil-fired boiler or by recovering the heat lost in combustion gases or heat from fuel cells or water vapor produced on site during the chemical reaction between a base solution (NaOH or Na2CO3 or other base) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

The fuel is obtained by mixing hydrogen and water vapor in the proportions defined above.

When hydrogen and water vapor are produced simultaneously during the chemical reaction between a base solution (NaOH or Na2CO3 or other base) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water, the proportion of water vapor in the fuel obtained can be adjusted by partial condensation of the water vapor in a direct contact or indirect contact heat exchanger.

According to another particularly advantageous feature, this hydrogen-based fuel is remarkable in that it has the following composition:

Hydrogen

Volume concentration in the mixture (fuel): 8 to 95% supplied from a hydrogen tank stored on site or from a hydrogen distribution network or produced on site from the electrolysis of water or from a chemical reaction between a base solution (NaOH or Na2CO3 or other base) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Water Vapor

Temperature: below the flash point temperature (flash or auto-ignition) of hydrogen Volume concentration in the mixture (fuel): 5 to 92% supplied from a pressurized water vapor distribution network or produced on site from demineralized water or distilled water or weakly mineralized water and from an electric boiler or a gas boiler or an oil-fired boiler or by recovering the heat lost in combustion gases or heat from fuel cells or water vapor produced on site during the chemical reaction between a base solution (NaOH or Na2CO3 or other base) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Hydroxide ions (OH—)

Trace in mixture (fuel)

Result from the entrainment of a part of the base solution (NaOH) by the water vapor produced on site during the chemical reaction between a base solution (NaOH or Na2CO3 or other base) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

The concentration of hydroxide ions can be adjusted by partial neutralization of hydroxide ions by passing the resulting fuel through a liquid that absorbs or neutralizes hydroxide ions.

To use the fuel obtained according to these first two compositions, the fuel is mixed with an oxidizer (air or pure oxygen) before being introduced into the combustion chamber or inside the combustion chamber so that the concentration of hydrogen in the final mixture is between 4 and 70%.

According to another particularly advantageous feature of the invention, this hydrogen-based fuel is remarkable in that it has the following composition Hydrogen Volume concentration in the mixture (fuel): 8 to 95% supplied from a hydrogen tank stored on site or from a hydrogen distribution network or produced on site from the electrolysis of water or from a chemical reaction between a base solution (NaOH or Na2CO3 or other base such as NaHO2 or a mixture of a solution of H2O2 and NaOH) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Water Vapor

Temperature: below the flash point temperature (flash or auto-ignition) of hydrogen Volume concentration in the mixture (fuel): 5 to 92% supplied from a pressurized water vapor distribution network or produced on site from demineralized water or distilled water or weakly mineralized water and from an electric boiler or a gas boiler or an oil-fired boiler or by recovering the heat lost in combustion gases or heat from fuel cells or water vapor produced on site during the chemical reaction between a base solution (NaOH or Na2CO3 or other base such as NaHO2 or a mixture of a solution of H2O2 and NaOH) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Oxygen

Volume concentration in the mixture: between 1 and 40% supplied from atmospheric air or air from a distribution network or from a pressurized air tank or from oxygen from the decomposition of hydrogen peroxide stored or produced on site or oxygen produced simultaneously with hydrogen and water vapor during the chemical reaction between a mixture of H2O2 and NaOH or between a solution of NaHO2 or between a suspension of NaHO2 in water with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

This is a fuel-oxidizer mixture. When hydrogen, water vapor and oxygen are produced simultaneously during the chemical reaction between a mixture of H2O2 and NaOH or between a solution of NaHO2 or between a suspension of NaHO2 in water with a metal (Al or Fe or Zn or Mg or an alloy of them), which metal is in the form of powder or in the form of pellets or in the form of flakes or in the form of pieces of plates, tubes or in the form of a suspension of particles in a liquid or in water. The proportion of water vapor in the resulting fuel can be adjusted by partial condensation of water vapor in a direct contact or indirect contact heat exchanger.

According to another particularly advantageous feature of the invention, the hydrogen-based fuel is remarkable in that it has the following composition:

Hydrogen

Volume concentration in the mixture (fuel): 8 to 95% supplied from a hydrogen tank stored on site or from a hydrogen distribution network or produced on site from the electrolysis of water or from a chemical reaction between a base solution (NaOH or Na2CO3 or other base such as NaHO2 or a mixture of a solution of H2O2 and NaOH) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Water Vapor

Temperature: below the flash point temperature (flash or auto-ignition) of hydrogen Volume concentration in the mixture (fuel): 5 to 92% supplied from a pressurized water vapor distribution network or produced on site from demineralized water or distilled water or weakly mineralized water and from an electric boiler or a gas boiler or an oil-fired boiler or by recovering the heat lost in combustion gases or heat from fuel cells or water vapor produced on site during the chemical reaction between a base solution (NaOH or Na2CO3 or other base such as NaHO2 or a mixture of a solution of H2O2 and NaOH) or an acid (HCl or H2SO4 or other acid) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Oxygen

Volume concentration in the mixture: between 1 and 40% supplied from atmospheric air or air from a distribution network or from a pressurized air tank or from oxygen from the decomposition of hydrogen peroxide stored or produced on site or oxygen produced simultaneously with hydrogen and water vapor during the chemical reaction between a mixture of H2O2 and NaOH or between a solution of NaHO2 or between a suspension of NaHO2 in water with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

Hydroxide ions (OH−)

Trace in mixture (fuel)

Result from the entrainment of part of the base solution (NaOH) by the water vapor produced on site during the chemical reaction between a base solution (NaOH or Na2CO3 or between a mixture of H2O2 and NaOH or between a solution of NaHO2 or between a suspension of NaHO2 in water) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

These hydroxide ions can be added from a NaOH solution stored on site or produced on site by electrolysis of water.

Hydrogen Peroxide

Volume concentration in the mixture: between 0 and 10%

Result from the entrainment of part of the hydrogen peroxide by the water vapor produced on site during the chemical reaction between a basic solution (mixture of H2O2 and NaOH or between a solution of NaHO2 or between a suspension of NaHO2 in water) with a metal (Al or Fe or Zn or Mg or an alloy of them), which metal is in the form of powder or in the form of pellets or in the form of flakes or in the form of pieces of plates, tubes or in the form of a suspension of particles in a liquid or in water.

This hydrogen peroxide can be added from a hydrogen peroxide solution stored on site or produced on site by electrolysis of water or by any other method.

This is also a fuel-oxidant mixture.

When hydrogen, water vapor, oxygen are produced simultaneously during the chemical reaction between a mixture of H2O2 and NaOH or between a solution of NaHO2 or between a suspension of NaHO2 in water with a metal (Al or Fe or Zn or Mg or an alloy of them), which metal is in the form of powder or in the form of pellets or in the form of flakes or in the form of pieces of plates, tubes or in the form of a suspension of particles in a liquid or in water, the proportion of hydrogen peroxide in the fuel obtained can be adjusted by partial or total decomposition of the peroxide by passing the fuel-oxidizer mixture obtained through a catalytic or electro-catalytic or electric decomposition device for decomposing the hydrogen peroxide.

The concentration of hydroxide ions can be adjusted by partial neutralization of hydroxide ions by passing the resulting fuel through a liquid that absorbs or neutralizes hydroxide ions.

The invention having been described above in its broadest aspects, other features and other advantages of it will appear on reading the text which follows, in relation with the accompanying drawings, giving non-limiting examples of devices and methods in accordance with the invention.

DESCRIPTION OF THE PREFERRED EMBODIMENTS

Figure 1:
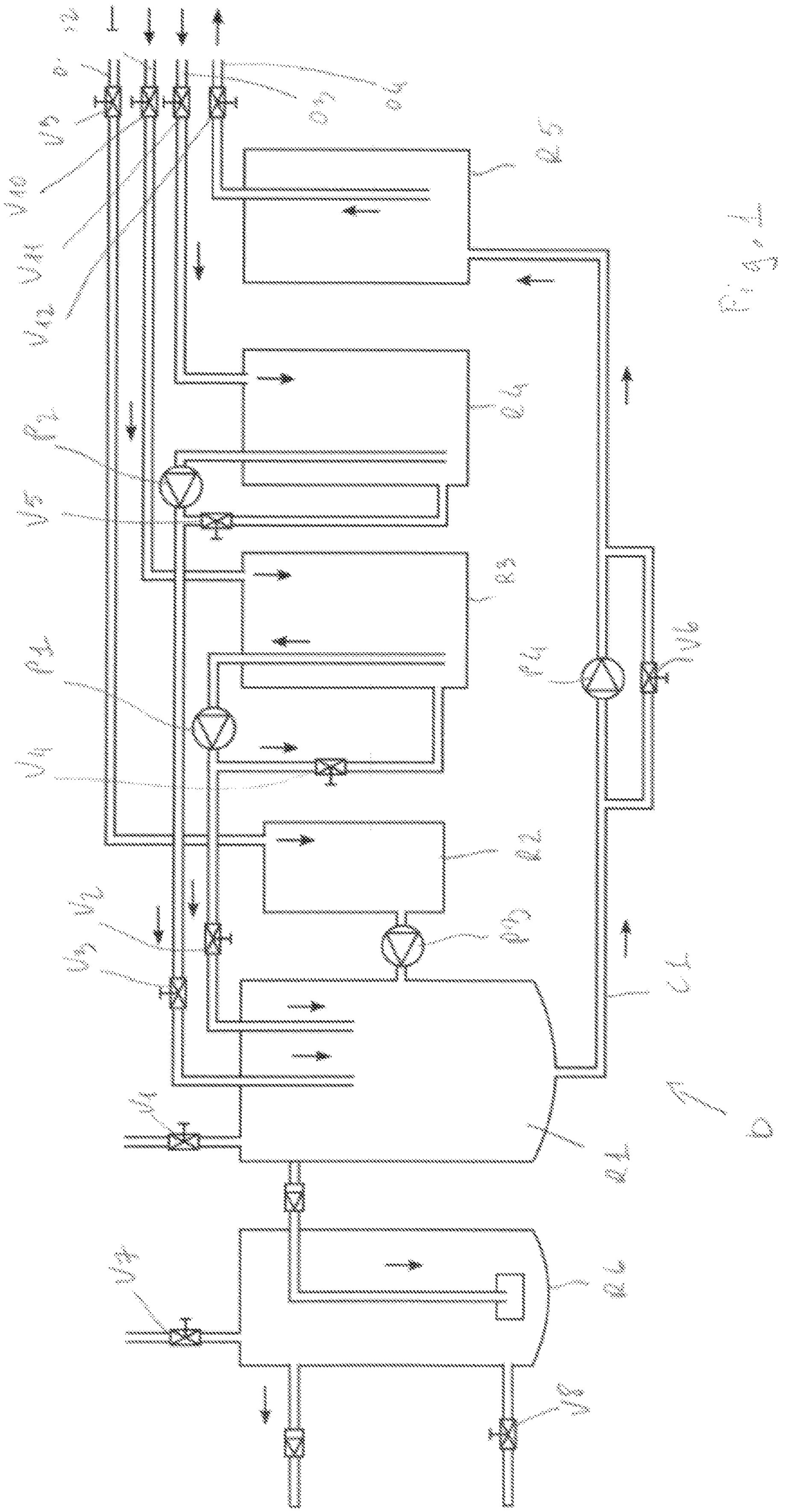
FIG. 1 is a schematic drawing of a first embodiment of a hydrogen production device according to the invention.

As shown in FIG. 1, the device denoted D as a whole ensures the production of hydrogen, for example for setting a vehicle (not shown) in motion in accordance with the method according to the invention.

This device D comprises a plurality of containers R.

R1 is the container called reactor defining an internal volume in which the corrosion reaction takes place, i.e. where the dihydrogen (or dihydrogen and dioxygen) is produced. Reactor R1 is supplied:

- with a solution containing a suspension of first metal M1 by being connected to a tank R3 which stores said suspension,
- with a solution containing a basic or acidic substance capable of reacting with metal M1 by being connected to a tank R4 which stores said solution.

A plurality of valves and pumps manage this supply.

R1 is also connected to a tank R2 of rinsing liquid for the purpose of cleaning its internal volume.

At the outlet, reactor R1 rejects dihydrogen to tank R6. It is also equipped with an outlet valve V1 and a reaction residue withdrawal pipe C1 which connects R1 to another tank R5 which stores the reaction residue.

Figure 3:
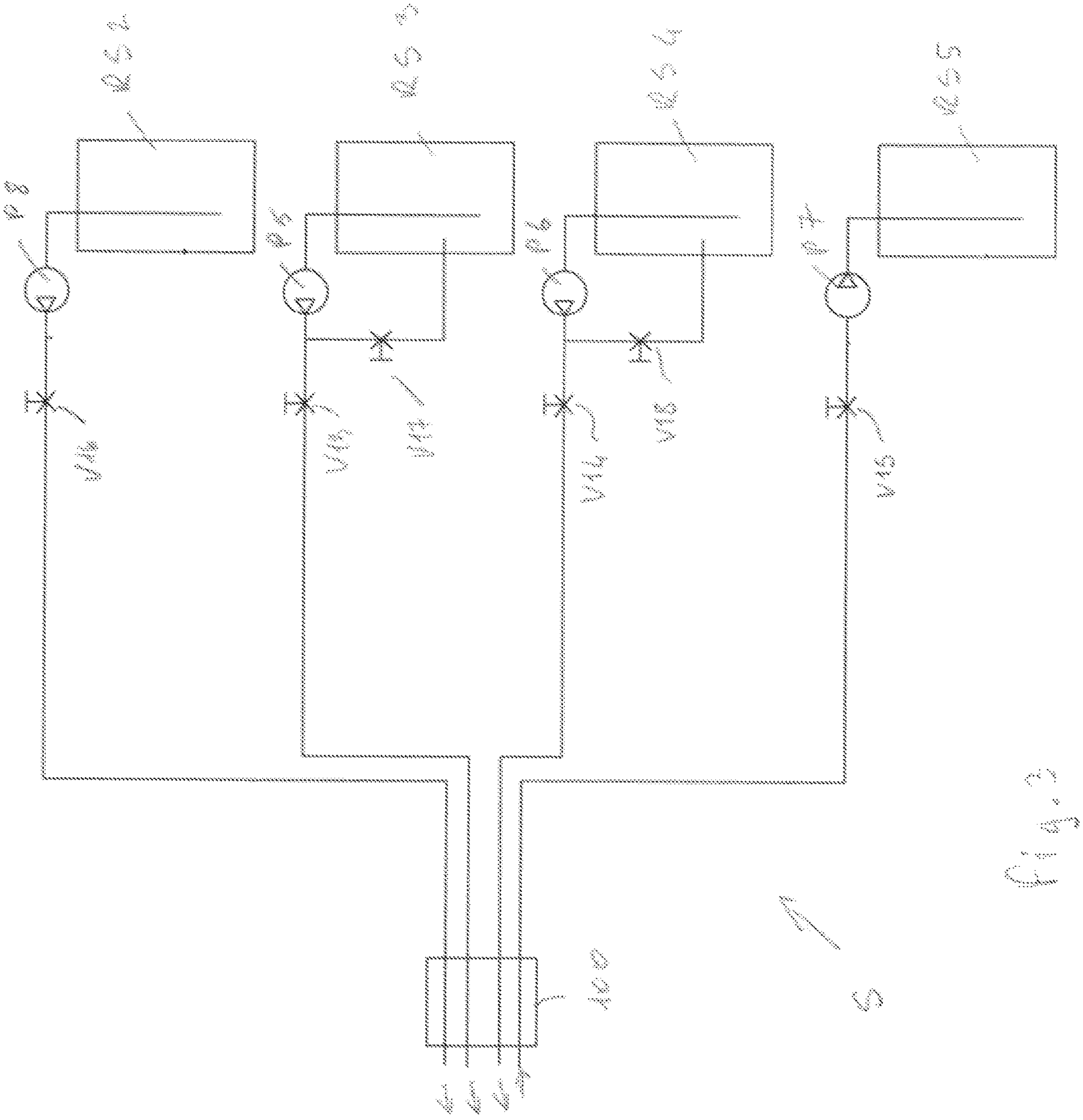
FIG. 3 is a schematic drawing of one embodiment of a power and maintenance station for the hydrogen generating devices of FIG. 1 and FIG. 2.

Each tank R actually comprises an inlet and an outlet. The storage tanks R2, R3, R4 and R5 communicate with the service station ensuring supply and maintenance shown by FIG. 3 and denoted S as a whole.

This station includes a service nozzle 100 managing the connection of four pipes to the device D. Each pipe is connected to a station tank RS2, RS3, RS4 and RS5 respectively providing storage:

- of rinsing liquid for RS2 to supply tank R2,
- of metallic suspension for RS3 to supply R3,
- of liquid containing a basic or acidic substance for RS4 to supply R4,
- of reaction residue for RS5 to discharge R5 An example of the steps of the operation carried out is described below.

Step 1—filling the R3, R3, R4 tanks:
- connection of service nozzle 100 to ports 01, 02, 03 and 04,
- opening of valves V9, V10, V11,
- closure of valves V17 and V18,
- opening of valves V13, V14, V16,
- start of pumps P5, P6 and P8.

Step 2—filling of hydrogen production tank R1:
- closing of valves V4, V5 and V6;
- opening of valves V1, V2 and V3,
- start of pumps P1 and P2,
- at the end of filling:
- stop pumps P1 and P2,
- closing of valves V1, V2 and V3,
- opening of valves V4 and V5.

Step 3—dihydrogen production reaction in R1:
- in R1, the corrosion medium containing the acidic substance or the basic substance coming from R4 is in contact with the suspension of metal M1 coming from R3;
- the dihydrogen-producing reaction operates for a fixed period of time.

Step 4—withdrawal of reaction residues:
- once the reaction is complete in R1, opening of valve V12 and start of pump P4,
- opening of the valve V1,
- filling the tank R5,
- at the end of the withdrawal of reaction residues:
- stop of P4 Pump
- closing of the valve V1,
- closing of the valve V12

Step 5—cycle repeat from step 1.

Step 6—draining of tank R5 and storage of the reaction residue:
- implementation of step 1 with in addition opening of valve V12 at the start of withdrawal (opening of valve V12 at the same time as opening of valves V9, V10 and V11) and closing of the valve V12 at the same time as valves V9, V10, V11 at the end of withdrawal.

Figure 2:
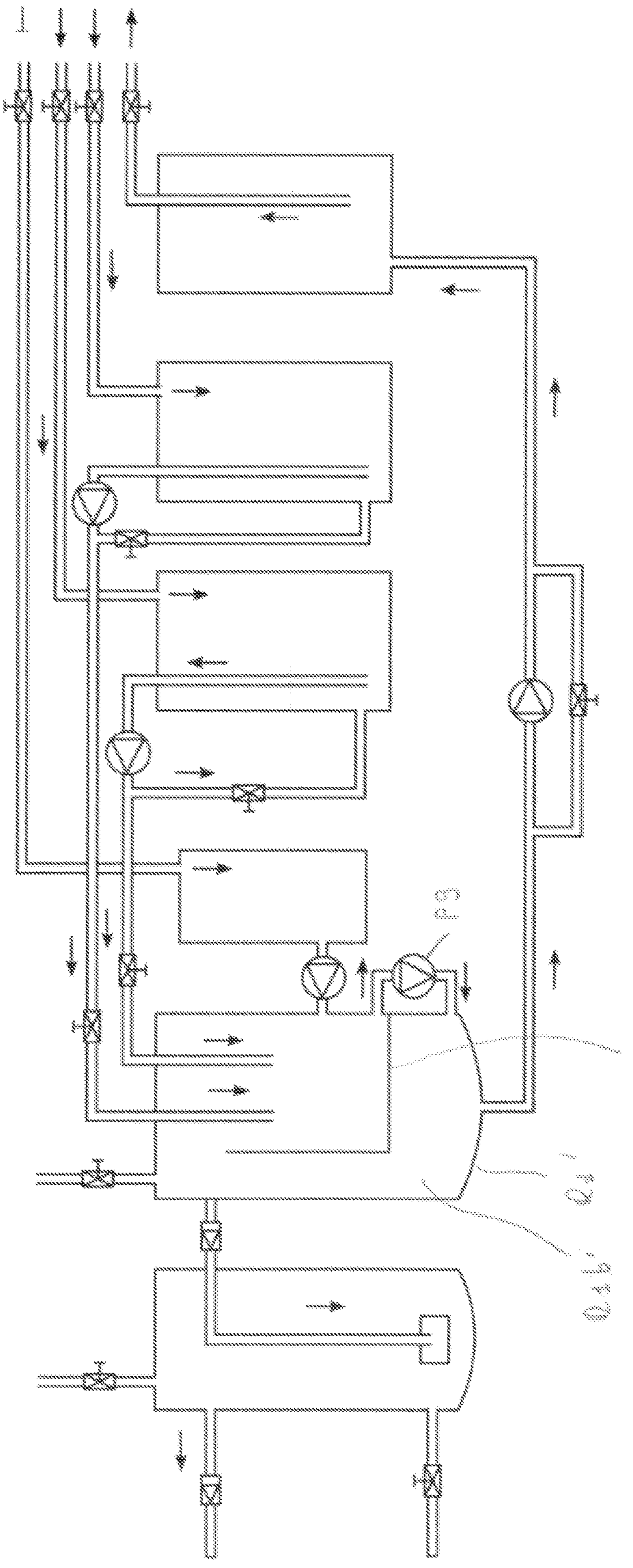
FIG. 2 is a schematic drawing of a second embodiment of a hydrogen production device according to the invention.

FIG. 2 shows a device D' which can also be supplied and maintained by the station S and which differs from the device D only in that the tank R1' where the reaction for the production of hydrogen (or dihydrogen and oxygen) is divided into two reactors:

a primary reactor R1*a*' and a secondary reactor R2*b*'.

The compartmentalization facilitates the recovery of the reaction residue, in particular by the P9 pump.

It is understood that the methods and devices which have just been described and represented above have been described for the purpose of disclosure rather than limitation. Of course, various adjustments, modifications and improvements may be made to the above examples, without departing from the scope of the invention.

The invention claimed is:

1. A method for producing a hydrogen-generating fuel, comprising mixing in a liquid, particles of one or more metals which are corrodible by a basic chemical substance or an acidic chemical substance for the purpose of producing hydrogen, said particles being kept in suspension in said liquid, said liquid being water, and the mixture made up of the liquid and said particles being chemically stabilized so as to prevent chemical reaction between the liquid and said particles, wherein the mixture made up of the liquid and the particles is chemically stabilized so as to prevent or reduce the chemical reaction between the liquid and the particles, wherein the stabilization of the mixture made up of the liquid and the particles is carried out by at least one of the following:

by maintaining the pH of the liquid before mixing with the particles between 1 and 7 depending on the chemical nature of the metals corrodible by a basic substance or an acidic substance, by maintaining the pH of the mixture made up of the liquid and the particles between 1 and 7 depending on the chemical nature of the metals corrodible by a basic substance or an acidic substance, by maintaining the pH of the mixture made up of the liquid, an anti-sedimentation agent and the particles between 1 and 7 depending on the chemical nature of the metals corrodible by a basic substance or an acid substance, by maintaining the pH of the mixture made up of the liquid, the anti-sedimentation agent, an anti-caking agent and the particles between 1 and 7 depending on the chemical nature of the metals corrodible by a basic substance or an acid substance.

2. The method for producing a fuel according to claim 1, wherein the size of the particles of one or more metals is between 0.001 micron and 1000 microns and can be of different sizes.

3. The method for producing a fuel according to claim 1, wherein the particles are kept in suspension in the liquid using at least one of the following methods:

by mechanical agitation of the mixture made up of the liquid and the particles, by forced circulation of the mixture made up of the liquid and the particles using a pump, by addition to the liquid before mixing with particles of the anti-sedimentation agent, by addition to the mixture made up of the liquid and the particles of the anti-sedimentation agent, by addition to the mixture made up of the liquid and the particles of the anti-caking agent.

4. The method for producing a fuel according to claim 3, wherein the anti-sedimentation agent is a liquid-thickening substance of the mineral-type.

5. The method for producing a fuel according to claim 3, wherein the anti-sedimentation agent is magnesium aluminum silicate.

6. The method for producing a fuel according to claim 1, wherein the particles are encapsulated with chemical substances of mineral-type, which substances are non-reactive with the liquid so as to prevent or reduce the chemical reaction between the liquid and the particles.

7. The method for producing a fuel according to claim 1, wherein maintaining the pH between 1 and 7 is achieved by adding an acid substance of the H2SO4 or HCl or H3PO4 or CO2 type or any type of mineral acid.

8. The method for producing a fuel according to claim 1, wherein one or more metals which are corrodible by an acidic substance or by a basic substance is chosen from the following list:

Aluminum
Aluminum alloy,
Zinc,
Zinc alloy,
Iron,
Iron alloy,
Copper,
Copper alloy,
Magnesium,
Magnesium alloy.

9. The method for producing a fuel according to claim 1, wherein the mass percentage of the particles in the liquid is between 1 and 99%.

10. The method for producing a fuel according to claim 1, wherein the liquid contains an antifreeze.

* * * * *